(12) United States Patent
Hussain et al.

(10) Patent No.: US 7,073,396 B2
(45) Date of Patent: Jul. 11, 2006

(54) CORIOLIS MASS FLOWMETER

(75) Inventors: Youssif A. Hussain, Weston Fevell (GB); Chris N. Rolph, Hartwell (GB); Neil Harrisson, Duston (GB)

(73) Assignee: Krohne AG, Basel (CH)

( * ) Notice: Subject to any disclaimer, the term of this patent is extended or adjusted under 35 U.S.C. 154(b) by 0 days.

(21) Appl. No.: 11/158,249

(22) Filed: Jun. 21, 2005

(65) Prior Publication Data

US 2005/0268731 A1     Dec. 8, 2005

(30) Foreign Application Priority Data

May 26, 2004   (DE)   ................ 10 2004 026 322
Jul. 29, 2004    (DE)   ................ 10 2004 036 926

(51) Int. Cl.
*G01F 1/84* (2006.01)

(52) U.S. Cl. ................................. 73/861.357

(58) Field of Classification Search ........... 73/861.354, 73/861.355, 861.356, 861.367, 861.357
See application file for complete search history.

(56) References Cited

U.S. PATENT DOCUMENTS

| | | | | |
|---|---|---|---|---|
| 4,311,054 A | * | 1/1982 | Cox et al. | ............. 73/861.356 |
| 5,307,689 A | * | 5/1994 | Nishiyama et al. | .... 73/861.357 |
| 5,321,991 A | * | 6/1994 | Kalotay | ................. 73/861.357 |
| 6,199,022 B1 | * | 3/2001 | Cunningham | ............... 702/54 |
| 6,327,915 B1 | * | 12/2001 | Van Cleve et al. | ..... 73/861.357 |

* cited by examiner

*Primary Examiner*—Jewel V. Thompson
(74) *Attorney, Agent, or Firm*—Cesari and McKenna, LLP; John F. McKenna

(57) ABSTRACT

A Coriolis mass flowmeter incorporates a measuring tube for guiding a flowing medium, a first oscillator for the oscillatory stimulation of the measuring tube, as well as a first oscillation sensor and a second oscillation sensor for picking up Coriolis oscillations of the measuring tube. The first oscillator, the first oscillation sensor and the second oscillation sensor are mutually spaced apart in the longitudinal direction of the measuring tube and the first oscillator is activated by an oscillation-stimulating control device. A third oscillation sensor is provided and positioned opposite the first oscillator at the same longitudinal distance of the measuring tube. Additionally or alternatively, a second oscillator and a third oscillator may be provided, with the second oscillator positioned opposite the first oscillation sensor and the third oscillator positioned opposite the second oscillation sensor, in each case at the same longitudinal distance on the measuring tube. All mutually opposite oscillators and oscillation sensors are of the same size, resulting in a "balanced" measuring tube while opening up various possibilities for improving the evaluation and control of the flowmeter, which in turn provides greater reproducibility and measuring accuracy.

7 Claims, 1 Drawing Sheet

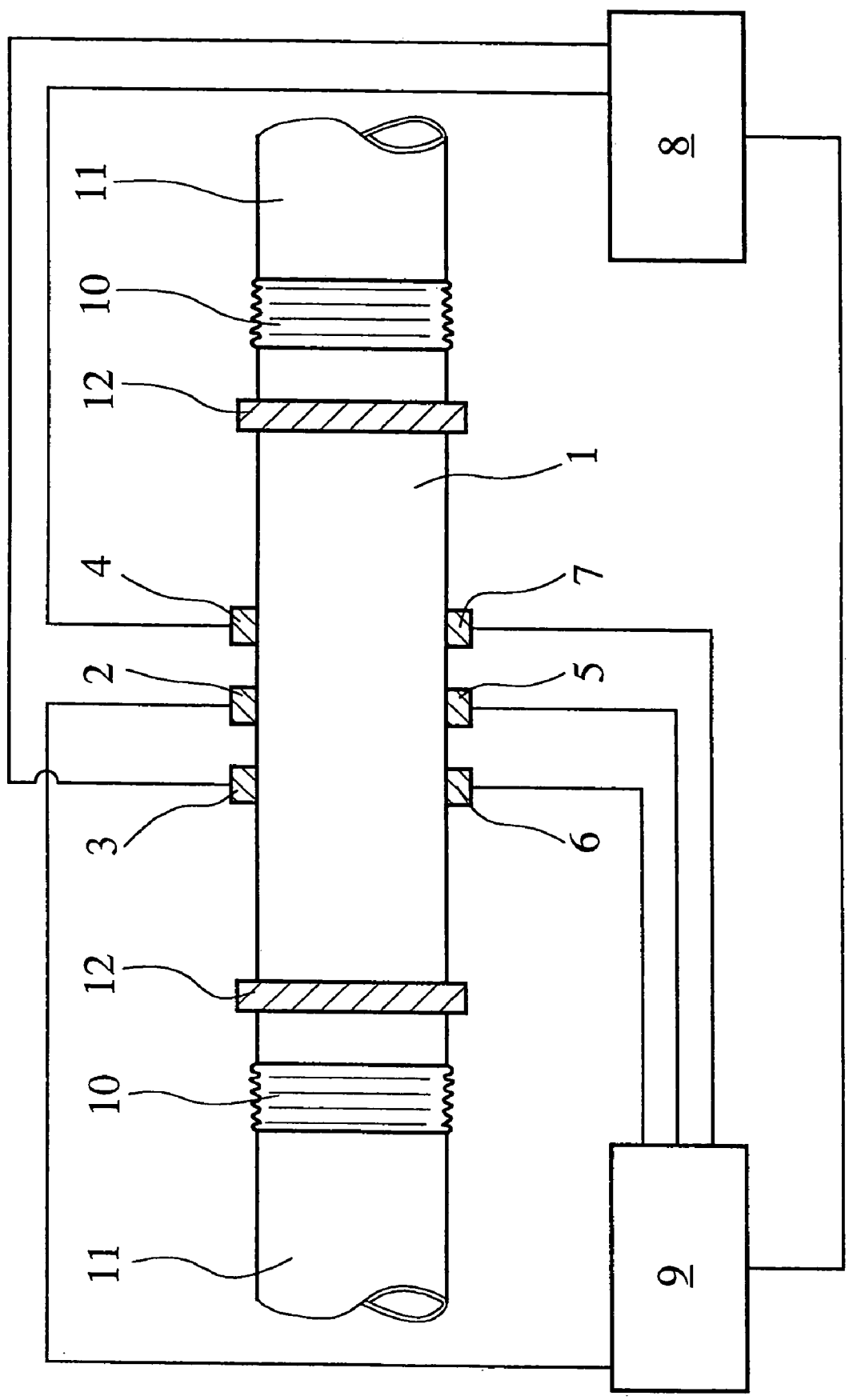

CORIOLIS MASS FLOWMETER

BACKGROUND OF THE INVENTION

1. Field of the Invention

This invention relates to a Coriolis mass flowmeter incorporating a measuring tube for guiding a flowing medium, a first oscillator for vibrating the measuring tube, as well as a first oscillation sensor and a second oscillation sensor for capturing the vibrations of the measuring tube, in which configuration the first oscillator, the first oscillation sensor and the second oscillation sensor are mutually spaced apart in the longitudinal direction of the measuring tube and the first oscillator is activated by an oscillation-stimulating control device.

2. Description of the Prior Art

A Coriolis mass flowmeter of this type has been described in WO 95/16897 A2. The Coriolis mass flowmeter according to that document employs the concept of oscillatory stimulation of the circumference of the measuring tube, producing vibrations that cause the diameter of the measuring tube to undergo vibration-induced geometric variations at least in the vibration-stimulating region. WO 01/92833 A1 describes a Coriolis mass flowmeter with similar stimulation of radial vibration of the measuring tube. As a particular feature of that latter Coriolis mass flowmeter, the wall thickness of the measuring tube is substantially less than the radius of the measuring tube, which greatly facilitates the generation of radial vibrations and the concomitant deformation of the circumferential surface of the measuring tube. Moreover, the length of the measuring tube in that Coriolis mass flowmeter is at least of the same order of magnitude as the radius of the measuring tube. The Coriolis mass flowmeter described in WO 01/92833 A1 thus features a measuring tube which due to its short dimension and its large inner diameter restricts the flow of the medium to a minor extent only, for correspondingly marginal interference with the flow in the pipeline in which the Coriolis mass flowmeter is installed.

The problem with these prior-art Coriolis mass flowmeters, however, is their unsatisfactory attainable measuring accuracy which, in particular, requires frequent recalibration.

SUMMARY OF THE INVENTION

It is therefore the objective of this invention to introduce a Coriolis mass flowmeter that offers a high degree of measuring accuracy.

Based on the Coriolis mass flowmeter concept described above, this objective is achieved by providing a third oscillation sensor opposite the first oscillator at the same longitudinal distance on the measuring tube.

Thus, according to the invention, a third oscillation sensor is positioned at a 180° angle opposite the first oscillator at the same longitudinal distance on the measuring tube, permitting that third oscillation sensor to detect for instance the excitation oscillation. If, as in a preferred embodiment of the invention, the size of the first oscillator is essentially identical to the size of the third oscillation sensor, the result is a "balanced" measuring tube. In addition, according to a preferred embodiment of the invention, the vibration signal captured by the third oscillation sensor is fed back to the oscillation-stimulating control device where it serves as a feedback signal for activating the oscillation excitation.

Even with the earlier Coriolis mass flowmeters designed as described above, a substantially improved measuring accuracy is obtainable especially in stimulating vibrations of the measuring tube circumference. Additionally, another preferred embodiment of the invention employs a second oscillator and a third oscillator, with the second oscillator positioned opposite the first oscillation sensor and the third oscillator opposite the second oscillation sensor, in each case at the same longitudinal distance on the measuring tube. Moreover, according to a preferred embodiment of the invention, the size of the second oscillator essentially corresponds to the size of the first oscillator and the size of the third oscillator essentially corresponds to the size of the second oscillation sensor, which again produces a "balanced" measuring tube.

Based on the Coriolis mass flowmeter concept described further above, the aforementioned objective is also achieved by providing a second oscillator and a third oscillator but not a third oscillation sensor, with the second oscillator positioned opposite the first oscillation sensor and the third oscillator opposite the second oscillation sensor, in each case at the same longitudinal distance on the measuring tube. Even without a third oscillation sensor, providing a second oscillator and a third oscillator can offer advantages in that it is possible to stimulate vibrations of the measuring tube that permit the real-time determination of characteristic properties of the Coriolis mass flowmeter such as its zero point and its sensitivity, a technique that has been described in DE 100 02 635 A1.

In this case again, a preferred embodiment of the invention provides for the size of the second oscillator to be essentially identical to the size of the first oscillation sensor, and the size of the third oscillator essentially identical to the size of the second oscillation sensor, so as to obtain a "balanced" measuring tube.

Although it says further above that a second oscillator and a third oscillator can be provided without also adding a third oscillation sensor, it is particularly desirable to simultaneously provide a second oscillator, a third oscillator and a third oscillation sensor, respectively positioned opposite the first oscillation sensor, the first oscillator and the second oscillation sensor, each being of the same size as the respectively opposite oscillation sensor or oscillator. A Coriolis mass flowmeter thus configured offers significant additional functionalities that can substantially enhance the measuring accuracy and reproducibility, while at the same time producing a "balanced" measuring tube.

While in essence the distance between the first oscillation sensor and the first oscillator and, respectively, between the second oscillation sensor and the first oscillator is arbitrarily selectable, a preferred configuration of the invention provides for the first oscillation sensor and the second oscillation sensor to be positioned at the same distance from the first oscillator on two different sides of the first oscillator. In like fashion, the second oscillator and the third oscillator, if provided, will be positioned at the same distance from the third oscillation sensor on two opposite sides of the latter.

In a preferred embodiment of the invention, the first oscillator, the first oscillation sensor and the second oscillation sensor are aligned along a straight line. Accordingly, if provided, the second oscillator, the third oscillator and the third oscillation sensor will be positioned along a straight line. As a particularly preferred feature, the measuring tube is at least in part and desirably in its entirety a straight unit, whereby the straight line along which the first oscillator, the first oscillation sensor and the second oscillation sensor are positioned extends parallel to the longitudinal axis of the measuring tube. It is also particularly desirable to position the first oscillator essentially in the center of the measuring tube as viewed in the longitudinal direction of the measuring tube.

As indicated above, the Coriolis mass flowmeter described here lends itself particularly well to an operation in which radial vibrations of the measuring tube are generated, meaning vibrations during which the diameter of the measuring tube undergoes geometric variations. In this connection, a preferred embodiment of the invention provides for the wall of the measuring tube to be sufficiently thin in relation to the radius of the latter to enable the first oscillator to stimulate, and the first and second oscillation sensors to capture, radial vibrations including the associated Coriolis oscillations of the measuring tube. It is particularly preferable to keep the wall thickness of the measuring tube smaller by a factor of 50 than the radius of the measuring tube. In this connection, it is also especially desirable for the wall thickness to be less than or equal to 0.5 mm and preferably smaller than or equal to 0.25 mm. In order to minimize the flow restriction through the Coriolis mass flowmeter, a preferred embodiment of the invention further provides for the length of the measuring tube to be of the order of magnitude of the radius of the measuring tube. This is possible especially because the measuring tube does not vibrate in all directions for instance like a guitar string. Instead, the measuring tube vibrates only in the radial direction, causing the circumferential surface of the measuring tube to deform, facilitated by the thin wall of the measuring tube. Finally, in a preferred design of the invention, the ratio between the length of the measuring tube and the radius of the measuring tube is smaller than or equal to 6:1 and preferably smaller than or equal to 4:1.

In the preferred embodiments of the invention, the measuring tube features at both ends a coupling sleeve for connecting the measuring tube to a pipeline system, with the sleeves designed to permit a "soft" coupling of the measuring tube to the pipeline. Specifically, such "soft" coupling of the measuring tube to the pipeline is achieved in that the sleeves are in the form of bellows. This largely eliminates any transfer of vibrations from the measuring tube of the Coriolis mass flowmeter into the pipeline system with a potentially resulting retroreflection of spurious oscillations into the measuring tube. Moreover, it will be helpful for the decoupling of the measuring tube of the Coriolis mass flowmeter from the pipeline system when, according to a preferred configuration of the invention, both extremities of the measuring tube are provided with a terminal mass which terminal mass preferably extends around the perimeter, specifically in annular form, of the measuring tube.

There are numerous ways in which the Coriolis mass flowmeter according to the invention can be configured and enhanced. In this context, attention is invited to the dependent claims as well as to the following description of a preferred embodiment of the invention with reference to the attached drawings.

BRIEF DESCRIPTION OF THE DRAWINGS

The single FIGURE is a schematic illustration of a Coriolis mass flowmeter according to a preferred embodiment of the invention.

DETAILED DESCRIPTION OF AN ILLUSTRATIVE EMBODIMENT

The Coriolis mass flowmeter schematically illustrated in the FIGURE incorporates a measuring tube 1 through which, when in operation, flows a fluid medium, not shown. The oscillation of the measuring tube 1 is activated by means of a first oscillator 2 which, viewed in the longitudinal direction of the measuring tube 1, is mounted precisely in the center of the measuring tube 1. In the longitudinal direction of the measuring tube 1, a first oscillation sensor 3 and a second oscillation sensor 4 are offset relative to the first oscillator 2. The first oscillation sensor 3 and the second oscillation sensor 4 are equidistant from the first oscillator 2. The first oscillator 2, the first oscillation sensor 3 and the second oscillation sensor 4 are all positioned along a line that extends parallel to the longitudinal axis of the measuring tube 1.

Located at a 180° angle opposite the first oscillator 2, the first oscillation sensor 3 and the second oscillation sensor 4, at the same respective longitudinal point on the measuring tube 1, are a third oscillation sensor 5, a second oscillator 6 and a third oscillator 7. The third oscillation sensor 5 is positioned opposite the first oscillator 2, the second oscillator 6 opposite the first oscillation sensor 3 and the third oscillator 7 opposite the second oscillation sensor 4. In the preferred Coriolis mass flowmeter embodiment described, it is important to match the size respectively of the first oscillator 2 and the third oscillation sensor 5, of the first oscillation sensor 3 and the second oscillator 6, and of the second oscillation sensor 4 and the third oscillator 7. Indeed, in the preferred implementation of the invention here described, all oscillation sensors 3, 4, 5 and all oscillators 2, 6, 7 are of the same size. The overall result is a "balanced" measuring tube 1.

The first oscillator 2, activated by an oscillation-stimulating control device 9, generates radial vibrations in the measuring tube 1. To facilitate this, the measuring tube 1 employed has a wall sufficiently thin in relation to its radius to enable the first oscillator 2 to generate, and the first oscillation sensor 3 and the second oscillation sensor 4 to capture, radial vibrations of the measuring tube 1 while also allowing Coriolis oscillations to be picked up. Specifically, the wall thickness of the measuring tube 1 is smaller by a factor of at least 50 than the radius of the measuring tube, for which the wall thickness selected for the measuring tube is less than 0.5 mm. As can be seen in the drawing FIGURE, this allows the length of the measuring tube 1 to be kept short enough to be of the same order of magnitude as the radius of the measuring tube 1. The first oscillation sensor 3 and the second oscillation sensor 4 serve the usual purpose of measuring the mass flow rate by sending the signals captured by the first oscillation sensor 3 and the second oscillation sensor 4 to an evaluation device 8.

Apart from producing a "balanced" measuring tube 1, the addition of the third oscillation sensor 5, the second oscillator 6 and the third oscillator 7 opens up the following possibilities:

The oscillation signal captured by the third oscillation sensor 5 is fed to the oscillation-stimulating control device 9 which, as stated, controls the vibration stimulation and thus in particular the activation of the first oscillator 2. By virtue of the positioning of the third oscillation sensor 5 at the same longitudinal point on the measuring tube 1 directly opposite the first oscillator 2 that essentially initiates the oscillation of the measuring tube 1, the third oscillation sensor 5 can capture a feedback signal which in the oscillation-stimulating control device 9 can be used to activate the first oscillator 2, for instance by tracking the excitation frequency to a temperature-dependent resonance frequency of the measuring tube by means of a phase-locked loop (PLL).

The additional oscillators 6, 7 also make it possible to stimulate the measuring tube 1 in another mode beyond the excitation mode, that being for instance the Coriolis mode. It permits the real-time determination of characteristic parameters such as sensitivity and/or the zero point of the Coriolis mass flowmeter as basically described for instance in DE 100 02 635 A1. That document describes the all-around vibration of the measuring tube of the Coriolis mass flowmeter, like that of a guitar string, whereas in the case here described the idea is to generate radial vibrations of the measuring tube 1. However, the basic principles of the method described in DE 100 02 635 A1 can easily be transferred to this present embodiment as well.

Thus, the overall effect of adding the third oscillation sensor 5 opposite the first oscillator 2, the second oscillator 6 opposite the first oscillation sensor 3 and the third oscillator 7 opposite the second oscillation sensor 4 and using identical sizes for all oscillators 2, 6, 7 and all oscillation sensors 3, 4, 5 is a "balanced" measuring tube as well as the obtaining of additional analytical, control and "real-time calibration" capabilities. The installation, configuration and function of the additional oscillation sensor 5 and of the additional oscillators 6, 7 create in a particularly synergistic manner a Coriolis mass flowmeter that offers considerably improved measuring accuracy and reproducibility compared to conventional Coriolis mass flowmeters.

Moreover, the Coriolis mass flowmeter according to the preferred embodiment of the invention here described offers additional features for improving the measuring accuracy and reducing any susceptibility to malfunctions. Specifically, the measuring tube 1 connects via bellows-type couplings 10 to the pipeline system 11 in which the Coriolis mass flowmeter is installed, the result being a "soft" coupling between the measuring tube 1 and the pipeline system 11. In terms of vibrations, this virtually decouples the measuring tube 1 from the pipeline system 11, so that only minimal vibrations migrate from the measuring tube 1 into the pipeline system 11 from where they could potentially be retroreflected as return oscillations into the measuring tube 1.

In the preferred embodiment of the invention described above, the measuring tube 1 is additionally provided at its two ends with a circumferential, i.e. annular, terminal mass 12. In practice it has been found that this terminal mass 12 contributes considerably to a further vibration isolation of the measuring tube 1 from the pipeline system 11. The combination of the bellows-type couplings 10 and the terminal mass 12 creates a frequency filter that quite substantially reduces the vibrational interaction with the pipeline system 11. On its part, the "balancing" of the measuring tube by virtue of the additional oscillation sensor 5 and the additional oscillators 6, 7, as explained above, virtually eliminates the asymmetric oscillations that have plagued conventional Coriolis mass flowmeters.

What is claimed is:

1. A coriolis mass flowmeter incorporating a measuring tube for guiding a flowing medium, a first oscillator for the oscillatory stimulation of the measuring tube, as well as a first oscillation sensor and a second oscillation sensor for picking up the vibrations of the measuring tube, in which the first oscillator, the first oscillation sensor and the second oscillation sensor are mutually spaced apart in the longitudinal direction of the measuring tube and the first oscillator is activated by an oscillation-stimulating control device, the improvement wherein a third oscillation sensor is provided and positioned opposite the first oscillator at the same longitudinal distance on the measuring tube, a second oscillator, and a third oscillator, the second oscillator being positioned opposite the first oscillation sensor and the third oscillation being positioned opposite the second oscillation sensor, in each case at the same longitudinal distance on the measuring tube.

2. The coriolis mass flowmeter as in claim 1, wherein the size of the first oscillator essentially corresponds to the size of the third oscillation sensor.

3. The coriolis mass flowmeter as in claim 1, wherein the size of the second oscillator essentially corresponds to the size of the first oscillation sensor and the size of the third oscillator essentially corresponds to the size of the second oscillation sensor.

4. The coriolis mass flowmeter as in claim 1 or 2 wherein the vibration signal collected by the third oscillation sensor is fed to the oscillation-stimulating control device where it serves as a feedback signal for activating the oscillation stimulation.

5. The coriolis mass flowmeter as in claim 1 or 2, wherein the first oscillation sensor and the second oscillation sensor are positioned, each at the same distance from the first oscillator, on two different sides of said first oscillator.

6. The coriolis mass flowmeter as in claim 5, wherein the first oscillator, the first oscillation sensor and the second oscillation sensor are positioned along a straight line.

7. The coriolis mass flowmeter as in claim 6, wherein the measuring tube has a straight longitudinal axis and the straight line along which the first oscillator, the first oscillation sensor and the second oscillation sensor are positioned extends parallel to said longitudinal axis.

* * * * *